United States Patent
Alagianambi

(10) Patent No.: US 12,513,150 B2
(45) Date of Patent: Dec. 30, 2025

(54) SYSTEMS AND METHODS OF MANAGING EXTERNAL USER ACCOUNTS FOR A CONTENT COLLABORATION PLATFORM

(71) Applicant: Atlassian Pty Ltd., Sydney (AU)

(72) Inventor: Thirumalaivelu Alagianambi, Mountain View, CA (US)

(73) Assignee: ATLASSIAN PTY LTD., Sydney (AU)

( * ) Notice: Subject to any disclaimer, the term of this patent is extended or adjusted under 35 U.S.C. 154(b) by 182 days.

(21) Appl. No.: 18/373,865

(22) Filed: Sep. 27, 2023

(65) Prior Publication Data

US 2025/0106217 A1   Mar. 27, 2025

(51) Int. Cl.
  *H04L 9/40*   (2022.01)
  *G06F 9/451*   (2018.01)
  *G06F 21/62*   (2013.01)

(52) U.S. Cl.
  CPC ............ *H04L 63/102* (2013.01); *G06F 9/451* (2018.02); *G06F 21/629* (2013.01); *H04L 63/108* (2013.01)

(58) Field of Classification Search
  USPC .......................................................... 726/4
  See application file for complete search history.

(56) References Cited

U.S. PATENT DOCUMENTS

| | | | | |
|---|---|---|---|---|
| 11,734,501 B1* | 8/2023 | Gui | ...................... | G06F 16/986 |
| | | | | 715/256 |
| 2015/0052144 A1* | 2/2015 | Mari | ..................... | G06F 16/285 |
| | | | | 707/740 |
| 2023/0046716 A1* | 2/2023 | Gao | ...................... | G06F 40/166 |
| 2023/0101588 A1* | 3/2023 | Dasdan | ................ | G06F 40/134 |
| | | | | 715/234 |
| 2024/0419465 A1* | 12/2024 | Riscutia | ............... | G06F 40/166 |

\* cited by examiner

*Primary Examiner* — Sanchit K Sarker
(74) *Attorney, Agent, or Firm* — Brownstein Hyatt Farber Schreck, LLP

(57) ABSTRACT

A method of managing external user accounts and tenant user accounts in a content collaboration platform may include: In response to a user request to access a document space, authorization credentials for the user may be obtained and a user account associated with the user may be identified. In accordance with the user account being an internal user account associated with a tenant user, a first graphical user interface (GUI) for the document space of the content collaboration platform may be displayed which includes: a content panel and a navigational panel. In accordance with the user account being an external user account associated with a non-tenant user, a permissions profile for the external user account may be obtained and from the permissions profile. A second GUI may suppress display of restricted pages. A first GUI may update the user-selectable banner to notify users of non-tenant user access.

8 Claims, 11 Drawing Sheets

- ⓘ YOU'RE AN EXTERNAL USER ON THIS CONFLUENCE SITE. SOME FUNCTIONALITY IS LIMITED. REQUEST FULL ACCESS.

EXXTREME TRAVEL

≡ OVERVIEW
❞ BLOG
⚙ SETTINGS

SHORTCUTS
- ☑ TOUR CHECKLIST

☰ PAGES
- EXXTREME TRAVEL MISSION
- › ACTIVE TOURS
- ⌄ TOURS UNDER DEVELOPMENT
  - ROCK CLIMBING IN COLORADO [EXT]
  - KAYAKING IN OREGON [EXT]
  - SNORKELING IN LOS CABOS

▤ ARCHIVED PAGES

EXXTREME TRAVEL / TOURS UNDER DEVELOPMENT

ROCK CLIMBING IN COLORADO

✎ [ SHARE | ⋯ | STAR THIS SPACE ]

◉ CREATED BY JOHN DOE
UPDATED 4 HRS AGO • 3 MIN READ • 👁 41 PEOPLE VIEWED

ⓘ EXXTREME TRAVEL WILL BE THE FIRST TO PROVIDE A ROCK CLIMBING TOUR OFFERING IN COLORADO'S FRONT RANGE. THIS WILL BE A GREAT OPPORTUNITY FOR US.

TEAM
(@JOHN) (@JANE) (@STAN) (@BOB)

BACKGROUND AND STRATEGIC FIT

TEAM TOURS ARE ONE OF OUR MOST POPULAR OFFER CATEGORIES AND HAVE DONE EXTREMELY WELL. CURRENTLY, NONE OF OUR COMPETITORS HAVE AN OFFER ON THE MARKET SO WE WOULD BE THE FIRST TO OFFER SUCH A TOUR.

[gauge chart]    AA ▯
                 BB ▯
🖼 ICON          CC ▯

FIG. 3

INVITE EXTERNAL USERS

INVITE EXTERNAL USERS TO YOUR PRODUCT. THEY WILL ONLY HAVE ACCESS TO THE SPACE YOU SPECIFICALLY GRANT THEM.

EMAIL ADDRESSES*

402 — | test use |

ENTER UP TO 10 EMAIL ADDRESSES, SEPARATED BY A COMMA. WE CAN'T SEND INVITATIONS TO DISTRIBUTION LISTS.

PRODUCT ACCESS

☑ CONFLUENCE GUEST

GROUP MEMBERSHIP

404 — | *ADD GROUPS* |

AVOID ADDING GROUPS THAT HAVE REGULAR PRODUCT ACCESS, AS THIS WILL GIVE GUESTS FULL PRODUCT ACCESS. IF IN DOUBT, SKIP ADDING A GROUP.

> PERSONALIZE EMAIL INVITE

406 — [ INVITE GUEST ] [ CANCEL ]

SYSTEMS AND METHODS OF MANAGING EXTERNAL USER ACCOUNTS FOR A CONTENT COLLABORATION PLATFORM

TECHNICAL FIELD

Embodiments described herein relate to a content collaboration platform with tenant and non-tenant accounts. In particular, the embodiments described here relate to techniques of providing access to non-tenant accounts in a content collaboration platform having restricted access.

BACKGROUND

Some traditional content systems restrict access to user-generated content and other system content. Traditionally, in order to provide access to system content, a traditional user account must be added and affiliated with an existing tenant or enterprise. However, the administrative overhead and computing resources required to add and manage traditional accounts can become burdensome over time. The systems and techniques described herein are directed to techniques and interfaces for providing access to non-tenant users without the drawbacks of some traditional systems.

SUMMARY

The methods and systems described herein relate to creating and managing external user accounts (e.g., non-tenant users) in content collaboration platforms. In some examples, a user input may be received to access a document space of a content collaboration platform. This user input may be received via a user device running an instance of the content collaboration platform in a browser application. A backend application may obtain credentials for the user and identify the user account associated with the user. If the user account corresponds to an internal user, a graphical user interface may be displayed including a content panel configured to display page content of a page from a set of user-generated pages and a navigational panel include a page tree that displays a set of selectable elements. In some cases, each of these selectable elements correspond to a respective page of the set of user-generated pages. In some circumstances, each element of the set of elements are arranged hierarchically and selectable to cause display of page content of the respective page in the content panel.

In examples where the user account is an external user account associated with the external user, an application may obtain a permissions profile for the document space. Using the permissions profile, a subset of designated pages from the set of user-generated pages may be identified. Each page may have an external permissions flag that corresponds to the external user account. In some cases, the subset of designated pages is designated to the tenant user and unique to the non-tenant user.

The graphical user interface (GUI) for the non-tenant user may look different. For example, at a GUI of the content collaboration platform corresponding to the non-tenant user, the GUI may suppress display, at the navigational panel, of a subset of restricted pages restricted to the non-tenant user, the subset of restricted pages may be different from the subset of designated pages. At a GUI of the content collaboration platform corresponding to the tenant user, in response to a determination that access has been permitted to the external account, the GUI may be updated to include display of a graphical element in the navigational panel, the graphical element corresponding to a respective page of the subset of designated pages.

In examples, in response to a user selection of the graphical element, a list of non-tenant users having access to the document space may be displayed. In response to a user request to revoke access to a non-tenant user of the list of non-tenant users with respect to a particular page, the permissions profile for the document space may be updated and display may be suppressed, at the non-tenant user's GUI, of a particular element in the navigational tree corresponding to the particular page.

As another example, in response to a user selection of the graphical element, a list of non-tenant users having access to the page and a revoke access request corresponding to each non-tenant user of the list of non-tenant users may be displayed. In response to a user selection of the revoke access request for a non-tenant user of the list of non-tenant users, a voting interface comprising an option to revoke access to the external user may be displayed. In some embodiments, in accordance with a majority of votes from the set of tenant users corresponding to revoking access to the non-tenant user, the permissions profile for the external user account may be updated and the GUI for the non-tenant user may suppress viewing of the page or of the document space.

Following on the above examples, in some cases the tenant user may receive a request to invite a second non-tenant user. The request may include a second subset of designated pages. In response to the request, a backend application may compare the first subset of designated pages to the second subset of designated pages and cause display of a suggestion to add at least a page from the set of user-generated pages to the second subset of designated pages, the suggestion generated based at least in part on the at least a page being part of the first subset of designated pages.

In some embodiments, the non-tenant user is a plurality of non-tenant users and the external account is a single external account shared by the plurality of non-tenant users. In some examples, each page may include a permissions profile which determines if an external user has different read/write permissions. The permissions profile may be specified by external users and/or be automatically determined by the backend system based on a criteria. For example, in some cases the permissions profile includes a time limit. In response to the time limit elapsing, the read and write access to the subset of designated pages may be disabled and the permissions profile may be updated.

Following on the above examples, in some cases the tenant user may received a request to invite a second non-tenant user. The request may include a second subset of designated pages. In response to the request, a backend application may compare the first subset of designated pages to the second subset of designated pages and cause display of a suggestion to add at least a page from the set of user-generated pages to the second subset of designated pages, the suggestion generated based at least in part on the at least a page being part of the first subset of designated pages.

In some embodiments, the non-tenant user is a plurality of non-tenant users and the external account is a single external account shared by the plurality of non-tenant users. In some examples, each page may include a permissions profile which determines if an external user different read/write permissions. The permissions profile may be specified by external users and/or be automatically determined by the backend system based on a criteria. For example, in some cases the permissions profile includes a time limit. In response to the time limit elapsing, the read and write access to the subset of designated pages may be disabled and the permissions profile may be updated.

In some cases, in accordance with the user account being an internal user account, authorization credentials may be obtained using a first level of security protocols. In accordance with the user account being the external user account, authorization credentials using a second level of security protocols may be obtained, the second level of security protocols may be lower than the first level of security protocols.

As described here, a method of managing external user accounts and tenant user accounts in a content collaboration platform may include: In response to a user input provided to a browser application authorization credentials for the user may be obtained. In accordance with the authorization credentials for the user being associated with a tenant user, a first graphical user interface (GUI) of a document space of a content collaboration platform may be displayed. The first GUI may include a content panel configured to display page content of a page from a set of user-generated pages and a navigational panel including a page tree configured to display a set of selectable elements. Each selectable element may correspond to a respective page of the set of user generated pages, each element of the set of elements may be arranged hierarchically and selectable to cause display of page content of the respective page in the content panel. In accordance with the user account being an external user account associated with a non-tenant user: a permissions profile for the document space may be obtained. Using the permissions profile, a subset of designated pages from the set of user-generated pages may be identified. The subset of designated pages may include an external permissions flag that corresponds to the external user account. In some cases, the subset of designated pages designated by the tenant user and may be unique to the non-tenant user. A subset of restricted pages from the set of user-generated pages may also be identified. The subset of restricted pages are different from the subset of designated pages.

At a second GUI of the content collaboration platform (corresponding to the non-tenant user), a modified navigational panel may be displayed. The modified navigational panel may include a set of non-selectable elements corresponding to each restricted page of the subset of restricted pages restricted to the non-tenant user and a subset of selectable elements corresponding to each designated page of the subset of designated pages. At the first GUI, in response to a determination that access has been permitted to the external account, the first GUI may be updated to include display of a set of graphical elements. In some cases, each graphical element of the set of graphical elements indicate non-tenant user access to a respective page of the subset of designated pages.

According to some examples, in response to a user selection of a graphical element corresponding to a designated page of the set of designated pages, non-tenant user data may be displayed indicating read or write access to the designated page. Each graphical element of the set of graphical elements may include a list of external users having access to the designated page.

In some cases, a user input comprising user-generated text may be received from the non-tenant user. At least a portion of the user-generated text may be analyzed to extract at least a portion of contact information for a new user. An invite user dialog may be displayed that includes a contact information box and a space designation box. In response to the tenant user input of contact information and space designation, an invitation link for the new user may be generated.

In some embodiments, a user input may be received from a non-tenant user. The input may include a selectable button. Upon selecting the button, a non-tenant user account dialog may be displayed. The dialog may include non-tenant user information and at least one document space selection. A non-tenant user account associated with the non-tenant user information and the at least one document space selection may be generated.

In another example, in response to a tenant user selection of the graphical element, a page permissions matrix may be launched, the page permissions matrix may include a list of external users and selectable read and write access controls for each external user of the list of external users.

In some embodiments described herein, a method of sharing internal dynamic content with external users in content collaboration platform may include: Subsequent to authenticating a tenant user with respect to the content collaboration platform, an authorization interface for a document space of the content collaboration platform may be displayed, The authorization interface may include a set of pages of the document space, the set of pages displayed in accordance with a hierarchical relationship between pages of the set of pages. A selection of one or more pages of the set of pages to be accessible by a non-tenant user not having an account with respect to the content collaboration platform may then be received. The hierarchical relationship of the set of pages may be parsed to determine if a selected page is a dependent page with respect to a page having access that is restricted with respect to the non-tenant user. In response to the selected page being the dependent page with respect to the page having restricted access with respect to the non-tenant user, in the authorization interface, a request to grant access to the restricted higher hierarchical level may be displayed. In response to a denial of the request, a new hierarchy for the selected page resulting in a removal of the dependency relationship to the page having restricted access may be generated.

In some cases, display of a user interface of the content collaboration platform may include: a content panel configured to display page content of a page and a navigational panel. The navigational panel may include a page tree configured to display the set of pages in their respective hierarchical arrangement and a user-selectable graphical element configured to notify the tenant user that the external user has access to the set of designated pages. In response to an approval to grant access to the restricted higher hierarchical level, the hierarchy may be updated in accordance with the dependency relationship.

Under some examples, in response to a selection, by the tenant user, of a selectable graphical element, an option to revoke access for the external user may be displayed. In accordance with a selection of the option to revoke access, access to at least one page of the content collaboration platform may be revoked. In some cases, in accordance with the selection of the option to revoke access, external user access to the content collaboration platform may be displayed. The set of pages to be accessible by the non-tenant user may be a set of spaces of the content collaboration platform, each space of the set of spaces may include a respective set of pages.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIGS. 2A-2C depict an example graphical user interface for tenant and non-tenant users.

FIG. 3 depicts an example permissions matrix.

FIG. 4 depicts an example graphical user interface for adding non-tenant users.

FIG. 5 depicts an example graphical user interface for granting page access.

FIG. 8 depicts a user management interface.

The use of the same or similar reference numerals in different figures indicates similar, related, or identical items.

Figure 1:
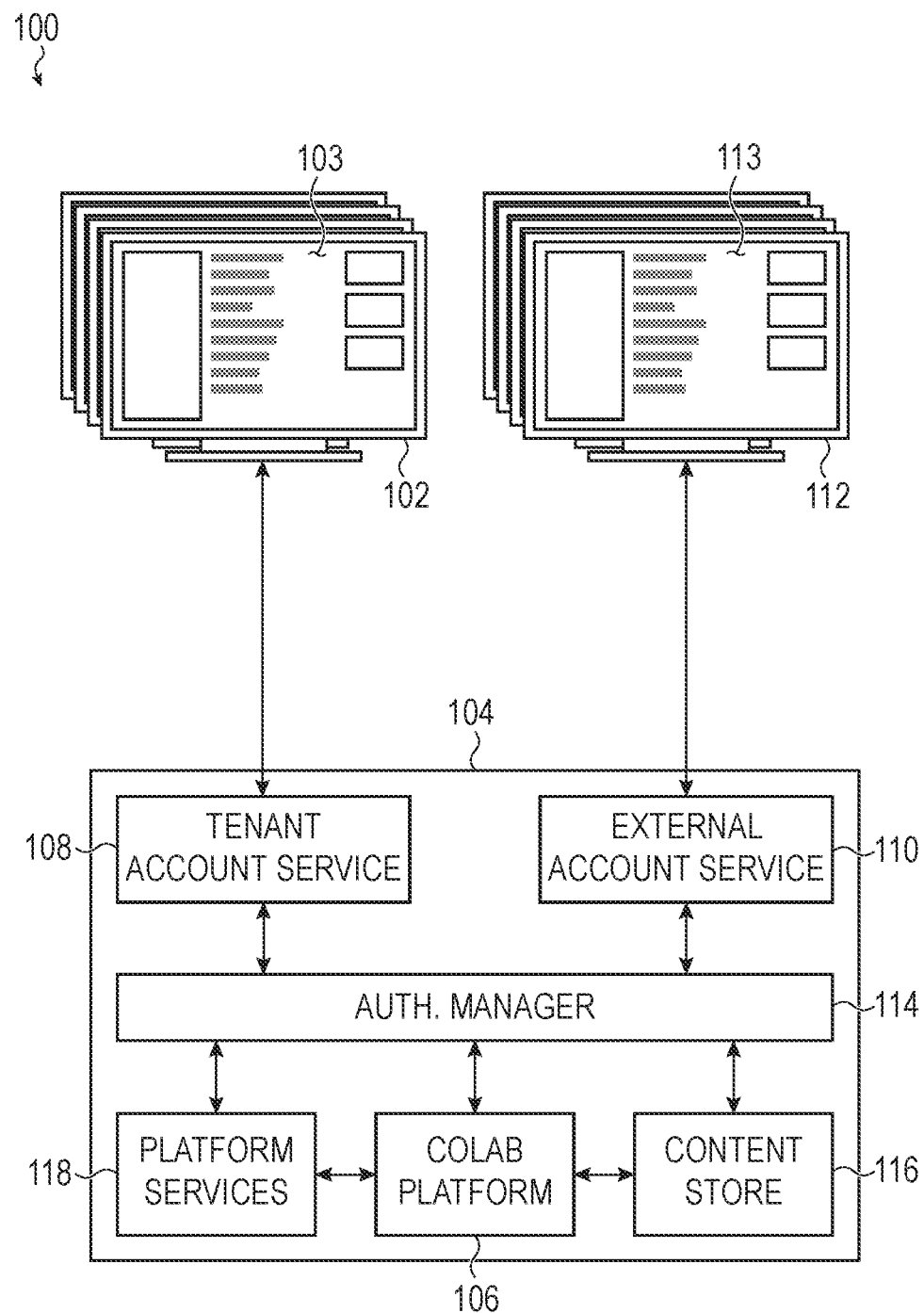
FIG. 1 depicts a system used for managing external users within a content collaboration platform.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The following description includes illustrations and examples that demonstrate various embodiments of the disclosure. Many of these examples are also illustrated in the accompanying drawings. It should be understood that the following description and examples are not intended to limit the disclosure to one preferred embodiment. Rather, it is intended that the following description covers alternatives, modifications, and equivalents as can be included within the spirit and scope of the disclosure and as defined by the appended claims.

Content collaboration platforms are an efficient way to collaborate with third parties. In content collaboration platforms, page content is dynamically updated, which helps keep third parties appraised of changes needed to perform their work. For example, a content collaboration platform can draw content from multiple sources and/or users and store data in a convenient way that fosters collaboration. By contrast, static content sharing (e.g., file sharing) generally requires employees to continuously update a file and communicate those changes to third parties. However, by its nature, content collaboration platforms defaults to giving its users widespread access to content. For example, most users in an enterprise may have access to most pages within the platform unless access for particularly sensitive content is restricted. While this model is beneficial in many situations, it may be difficult to extend a similar access to a third party when collaborating outside of the organization. Specifically, granting widespread access to a third party similar to internal accounts may risk exposing potentially sensitive information to an external party. Even when only restricted access is granted to third parties in a content collaboration platform, the process of setting restrictions can be time-consuming (often manual). In many cases, granting access to external third parties requires external third parties to obtain a license and pay for access to the organization's software platform or software platform suite to the able to access documents. Managing additional licenses and the traditional administrative system overhead of maintaining additional licenses is not an efficient way to handle external collaborations, which may have a short duration or be temporary, by nature.

Once external users have access to the platform, keeping track of external users is difficult—particularly with larger enterprises. In many circumstances, an external user may be granted access to a single space within the platform yet internal users (hereinafter "tenant users") of the platform may not be aware of the external user. By not being aware of external users, the tenant user may add confidential information not intended for external third parties. Similarly, the content in a space changes as projects evolve and as personnel initially associated with projects change. As personnel moves in and out of a space, employees may lose track that an external user had been granted access to the platform and, when the collaboration ends, the external user's access to the platform is rarely terminated.

The embodiments described herein can be used to facilitate management of external users once external users have access to a content collaboration platform. In particular, tenant users can invite external users into the content collaboration platform by designating a set of pages or a space in the platform for the external user to access. An external user account is created in response to the invitation, which has limited functionality and restricted access to pages not expressly granted by the tenant user. By using a different account "type" (e.g., an external user account), external users can be flagged to tenant users. For example, a graphical user interface (GUI) of a tenant user displays graphical elements, such as banners and other graphical warnings when a space has been shared with external users.

These graphical elements may be selectable and give tenant users options to restrict access previously granted to external users. The selectable graphical elements also allows users to check which external users are accessing the space and/or vote on access for external users to that space. In this configuration, any tenant user (whether administrator or not) can have input in external user access. Democratizing and/or decentralizing external user access provides better controls over enterprise data because the responsibility does not fall onto a single or a few individuals. A decentralized access system also adapts to changes in page content of a space because each user contributing to the space can moderate their content and/or restrict external user access if content moderation is not practicable and/or desirable. In some embodiments, the graphical elements are generated in response to an external user account type having access to the space. By using different account types, a backend service keeps track of the user and defaults the access restrictions to minimum access, which may be the opposite of tenant user accounts access type. Furthermore, because external user accounts do not have access to the full suite (e.g., a license has not been purchased), feature restrictions and/or any restriction can be placed.

By way of example, a tenant user may click on a graphical element and select a user from a list of external users accessing the space. The tenant user may revoke space and/or page access to the external user. In some embodiments, revoking access triggers a prompt to an administrator to permanently revoke access and/or restore access to the space and/or page. In other embodiments, revoking access may trigger a voting option amongst other tenant users of the space to determine whether the external user should have access to the space. In other embodiments, revoking access by any tenant user permanently revokes external user access. A tenant user may also review the type of access (e.g., read, write, archive) an external user has to a give page or document space. Each access type or feature may be revoked and/or granted by a tenant user. In some embodiments, the content panel of the content collaboration platform may display additional graphical elements to warn tenant users of external user access to the page and/or watermarks within the page content. As another example, in response to a user selection of a page that has external user access, a window may be displayed to warn the tenant user before the page content is displayed.

The collaboration platform may generate a GUI with a restricted view for an external user. For example, features of the content collaboration platform may be suppressed from display. These features may include personnel list, access to other software within the suite, and other editing features for the page content. Similarly, the page tree within the navigational panel of the platform may be modified in accordance with the designated tree elements corresponding to the pages that the external user has access to. For example, if a user has access to a subset of pages within a space, the page tree will display only the subset of tree elements. In some embodiments, an external user may have access to a page that has a child relationship with respect to a parent page that is restricted to the external user. In those cases, a backend application may "move" the tree element associated with the page outside the parent/child relationship and display the tree element without the user-generated hierarchy. In other embodiments, granting access to a page automatically grants access to all higher level pages (e.g., grants access to the parent and/or grandparent).

External user account types may have additional restrictions to facilitate managing access once in the platform. For example, external accounts may be disabled after a predetermined period of time has elapsed. This time period may be one week, one month, one year, and so on. After the time has elapsed, external user accounts may be automatically disabled which removes the administrative burden of manually eliminating user accounts. As another example, external user accounts may have a limit on the number of spaces and/or pages that the external user can access. By imposing limits, tenant users may better tailor access to those pages that are relevant to the external user's scope. In some embodiments, the tenant users may invite up to a threshold number of external users.

In some embodiments, the content collaboration platform includes a series of interfaces that makes granting external user access easy. For example, any tenant user may invite an external user by providing contact information and designating spaces and/or pages to the external user. An external user that receives an invite may access the platform using different security protocols from tenant users and may begin collaborating immediately (e.g., without an administrator specifying role or rule based access restrictions). In some embodiments, the invite window may provide suggestions to a tenant user of other external users that should have access to the platform, other spaces and/or pages to designate to the external user, and so on. These suggestions may be based on information from the platform (e.g., similar external users, semantically similar pages) or from third party services (e.g., calendars, teleconferencing apps, social media). In other embodiments, suggestions may be provided to the tenant user in edit mode of a page. For example, the tenant user may input a command that prompts a tenant user to invite an external user. A backend application may use a portion of the input text in the command to make suggestions on which external users to invite. As another example, in response to a tenant user adding a mention or a label to the page, an external user may be granted access to the page.

These foregoing and other embodiments are discussed below with reference to FIGS. 1-9. However, those skilled in the art will readily appreciate that the detailed description given herein with respect to these figures is for explanation only and should not be construed as limiting.

FIG. 1 depicts an example system 100 for collaborating with external users using a content collaboration platform. In particular, the system manages external user access using designated accounts and alerts tenant users when external users have access to a space and/or a set of pages within the platform. By flagging external users, tenant users can moderate the content of the shared pages to prevent sensitive information from being disclosed or can restrict the external user from accessing a page. The systems and methods described herein decentralizes access controls of a content collaboration platform, which allows for a more responsive way of collaborating using the enterprise's platform. The graphical elements, such as alerts and banners, displayed helps tenant users keep track of the external users throughout the collaboration and allows tenant users to terminate access to the platform quickly when the collaboration ends.

As depicted in FIG. 1, the system 100 may include a client device(s) 102. The client device 102 is configured to execute a client application that displays a graphical user interface 103. In some embodiments, the client application is provided by a Web browser, dedicated application, or other similar software application that is configured to access content and develop new content for one or more collaboration platforms provided by the hosted platform services 104. More specifically, through the internet, client devices 102 may be communicably coupled to a computer network configured to access a host server. The computer network may include a distributed network including networking services provided by one or more internet service provider. The host server may include one or more servers and may use one or more virtual physical computing resources (collectively referred in many cases as a "cloud platform"). As described herein, the client application may be configured to provide the functionality related to one or more of the collaboration platforms 106 supported by the hosted platform services 104. The collaboration platform 106 may include a documentation platform or content creation platform configured to allow for enterprise-wide content creation.

The hosted platform services 104 may include a tenant account service 108 and an external account service 110. The tenant account service 108 manages the user profile, features, and authentication of the tenant users of the platform. As described herein, tenant users refers to users of a platform that have full access to the software suite within the content collaboration platform. Generally, tenant users may be employees and/or internal personnel of an organization that use the content collaboration platform. In some embodiments, tenant users may create, add, delete spaces and pages within the content collaboration platform. Tenant users may also have access to blog, personnel list, and other features of the content collaboration platform. In some examples, tenant users are attributed broad access within the platform. For example, the platform may default all tenant users to unrestricted view and write access to any space within the content collaboration platform. In some cases, restrictions to access may be assigned on an individual basis. Because of the broad access defaults, granting access to external users may be administratively cumbersome because restrictions may need to be manually placed for each external user. Furthermore, an external user with access to the full software suite may have access to features, such as personnel lists and other suites, regardless of viewing restrictions of any particular space.

The external account service 110 manages the user profile, features, and authentication of external users of the platform. External users accounts are limited-use accounts that allows external users to access only page content to which the external user has affirmatively been granted access. In other words, unlike tenant accounts, which default to have access to any space within the platform, external accounts default to have no access unless it is expressly granted. In some embodiments, a tenant user grants access to an external user via the external user account service 110. To grant access, the tenant user may specify external user contact information, such as an email, and a space within the content collaboration platform. In some examples, the tenant user may designate only a set of pages (or a single page) within a space. In other embodiments, the tenant user may grant access to multiple spaces and/or multiple pages within the multiple spaces. In response to receiving the contact information and page designations, the external account service may load the permissions onto a user profile. Additionally, the external account service may update the permissions access at each page where the tenant user has designated access. The external account service 110 may also send a notification to the external user (e.g., via an email or other communication) that access has been granted. In response of an access request, an external user may access the content collaboration platform via a client device, such as client device 112. The designated pages and user profile may be used to generate a graphical user interface 113 which is configured to display a content collaboration platform with limited functionality.

In some cases, the tenant account service 108 and the external account service 110 may authenticate the user via the authorization manager 114. In particular, user account information from each client device 102, 112 may be used by the authorization manager 114 to authenticate the user and allow access to the content store 116, the collaboration platform 106, and/or other platform services 118. Based on the user account information, the authorization manager 114 may determine the type of user account and use different authentication methods to authenticate the user. For example, in response to a user access being a tenant account, the authorization manager 114 may prompt two-factor authentication to allow the user access to the content collaboration platform. By contrast, in response to a user access being an external user account, the authorization manager may prompt a single password or passphrase to allow external user access to limited content within the content collaboration platform. In some embodiments, the authorization manager may implement a single sign-on (SSO) system for external users. In other embodiments, the authorization manager may implement the same security protocols for tenant users and external users.

Through the tenant and external account services 108, 110, different GUIs are generated based on the type of account. GUI 113 has limited visibility of the content of platform and suppresses display of most platform services 118. For example, the GUI 113 does not have access to internal personnel lists or the enterprise's Information Technology Management Systems (ITSM) and other potentially sensitive content or data stores. Instead, because of the type of account, an external user may only view page content of designated pages granted by the tenant user. On the tenant user side, the tenant user account service 108 enables, through the authorization manager 114, access to the collaboration platform, its content store, and other platform services. In addition to the traditional features of the collaboration platform, GUI 103 has a series of graphical elements, such as warnings and/or banners that are triggered by external user access to the platform which allows the tenant user to manage access. In particular, the tenant user may be displayed graphical elements, such as banners for each page where the external user has access. The tenant user may have the option to terminate access to the external user and/or obscure from access certain content. In some embodiments, the tenant user has the ability to terminate external user access, regardless of whether the tenant user invited the external user to the platform and/or regardless of whether the tenant user is an administrator of the space. In this configuration, external user access can be controlled through a crowdsourcing model, reducing the responsibility for a single individual (or a few individuals) to manage user access. Examples of these graphical elements include a banner at the top of the navigational panel which displays which external users have access to the space. As another example, page content may have a watermark indicating that there is external user access. Through the use of external accounts, the system 100 can generate the graphical elements for external users to, for example, warn the user of the external user. By contrast, in systems where external users are added in an organization's content platform with access restrictions, internal users may not be aware of the external user's access and enterprises can lose track of such individuals within the system.

As depicted in FIG. 1, a system 100 as described herein may have multiple computing devices operably coupled by a computer network. The system includes client devices 102 and 112. The client devices 102, 112 can be any suitable electronic device; examples include a desktop or laptop computing device. In other examples, the client devices 102, 112 may be a mobile device such as a tablet or a cellular phone. It may be appreciated that these example electronic devices are not exhaustive, any suitable device may be a client device as described herein. The client devices 102, 112 which may include hardware as described in FIG. 9.

In many embodiments, a client application (also referred to as a "frontend") may be configured to provide client-side functionality of a software platform (a documentation or content creation service or other collaboration platform). More specifically, the client application may be configured to communicably couple to a separate instance of software executing on, and/or instantiated by, a host system or server configured to provide server-side ("backend") functionality of the hosted platform services 104 (e.g., documentation or content creation service). In this manner, a documentation or content creation service is defined in part by a frontend executing/instantiated on a client device and in part by a backend executing/instantiated on a host server of the hosted platform services 104 in communication with the frontend.

In this example, the hosted platform services 104 and external platform services include a host server supporting the backend configured to operate within, or as, a virtual computing environment that is supported by one or more physical servers including one or more hardware resources such as, but not limited to (or requiring) one or more of: a processor allocation; a memory allocation (also referred to as a working memory); non-volatile storage (also referred to as persistent memory); networking connections; and the like.

Further, it may be appreciated that although referred to as a singular "server," a host server supporting the backend may be a cluster of different computing resources, which may be geographically separated from one another. In this manner, because specific implementations may vary, both the host server (of the hosted platform services 104 and external platform services) and the client device 102 can be referred to, simply, as "computing resources" configured to execute purpose-configured software (e.g., the frontend and the backend).

As used herein, the general term "computing resource" (along with other similar terms and phrases, including, but not limited to, "computing device" and "computing network") may be used to refer to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems); embedded devices and systems and components thereof (e.g., system(s)-on-chip, Internet-of-Things devices); industrial control or automation devices and systems and components thereof (e.g., programmable logic controllers, programmable relays, supervisory control and data acquisition controllers, discrete controllers); vehicle or aeronautical control devices systems and components thereof (e.g., navigation devices, safety devices or controllers, security devices); corporate or business infrastructure devices or appliances (e.g., private branch exchange devices, voice-over internet protocol hosts and controllers, end-user terminals); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices); and so on. It may be appreciated that the foregoing examples are not exhaustive. An example hardware configuration is described in FIG. 9.

These foregoing embodiments and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

Figure 2A:
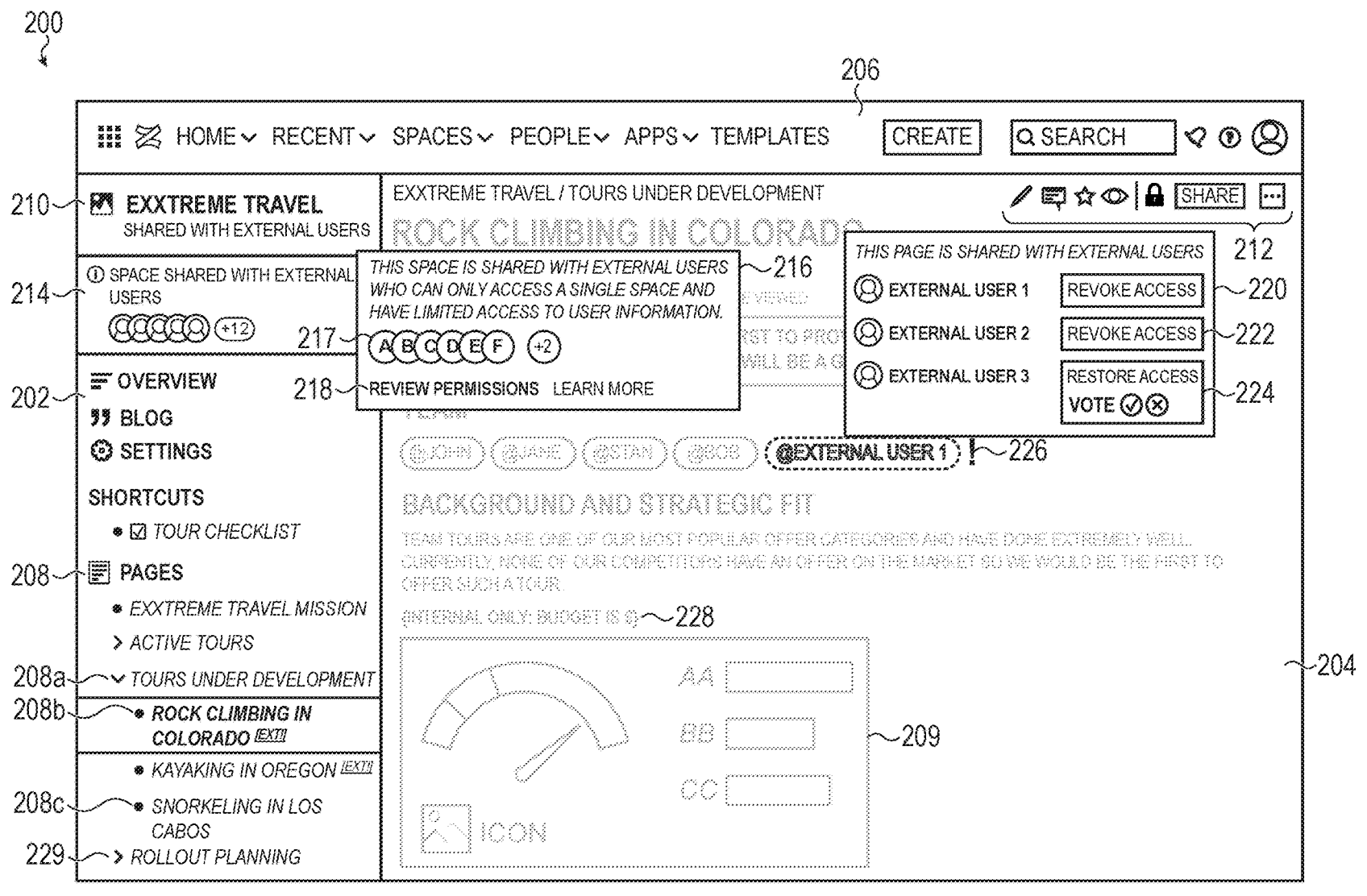

FIG. 2A shows an example graphical user interface (GUI) of a content collaboration platform for a tenant user hosting external user accounts. As depicted, the GUI may have several graphical elements, such as notification interfaces that signal to the tenant user that an external user has access to a space of the content collaboration platform, or that the external user has access to a user-generated page within the space. These graphical elements, such as notification banners, warnings, alerts, interactable elements, can help a tenant user assess whether to include confidential or internal-only content (e.g., content that should be restricted to external users), whether to invite other external users, whether certain external users should be excluded from the page, or similar assessments that help control the internal information of an entity that is shared with third parties.

In some embodiments, the graphical elements and the selectable options within the banners are available to tenant users with administrative privileges and/or tenant users without administrative privileges. Allowing tenant users without administrative privileges to revoke access (permanently or temporarily) to external users may be more responsive to the needs of the tenant user because it reduces the waiting period associated with administrator approval. In some embodiments, the administrator may have sole permission to permanently revoke access to the external user. In this embodiment, the access of external users is more consistent allowing for a more uniform permission scheme of the space.

As shown in FIG. 2A, a GUI 200 of a content collaboration platform includes a navigational panel 202, a content panel 204, and a top menu 206. The navigational panel 202 may include a page tree 208 that shows a set of hierarchically-arranged selectable tree elements within the space 210. For example, selectable element 208a is a parent of selectable element 208b and other selectable tree elements. As another example, selectable tree element 208c does not have a parent/child relationship with respect to other pages. The hierarchical page tree 208 helps the user navigate through the space and find elements that correspond to pages and/or document spaces intuitively based on their hierarchy. In some embodiments, as shown in the figure, the parent elements may be collapsed to suppress display of the children elements within that hierarchy. Each tree element within the page tree is selectable to display page content in the content panel 204. For example, in response to a user selection of selectable tree element 208b, the GUI 200 is updated to display the page content corresponding to tree element 208b and the selectable tree element 208b within the navigational panel may be highlighted to (e.g., shaded, bolded) to indicate to the user the tree element selected. In some cases, a graphical element 214 may be displayed adjacent to a selectable tree element (e.g., selectable tree element 208*b*) within the page tree to indicate to the user that the page is visible externally. For example, as shown in FIG. 2A, the page element 208*b* "ROCK CLIMBING IN COLORADO" includes a "[*EXT!*]" graphical element 214 to warn other users prior to selecting the tree element.

Page content may include text, author of the page, miscellaneous information of the page (e.g., last updated, number of views), mentions, multimedia content, and/or external data embedded as API content. This embedded content 209 may include tables, data from other platforms (e.g., Jira), data from websites, calendar, or the like. The page content may be formatted in accordance with a platform-specific schema or format including one or more markup languages or other types of schema. In response to a user selection of a page containing third party embedded content 209, the tenant user credentials may be authenticated to determine access and/or other restrictions to the embedded content 209. Based on the credentials of the tenant user, the embedded content 209 may be displayed or suppressed to the tenant user. Similarly, individual content items of the page content may be associated with a permissions profile and the display of respective content items may be suppressed depending on the level of access provided to the user accessing the content. The content panel may display additional features 212. The additional features 212 may be available to tenant users, such as editing, commenting, starring, viewing, locking, and sharing page content. The navigational panel 202 may also have additional selectable options, such as an overview of the navigational panel, links to blogs within the space, settings, shortcuts, and so on.

As discussed above, the GUI of the content collaboration platform for the tenant user may include one or more selectable graphical elements. In some embodiments, the GUI includes selectable graphical element 214. Selectable graphical element 214 may be positioned within the navigational panel 202 and displays a list of external users with access to the space 210 or with access to a page(s) within a space. The list of external users displays in selectable graphical element 214 may be unique to each page. In some examples, the list of external users is a collapsible list showing pictures, initials, avatars, and/or other information to identify external users. In response of a user selection of the collapsed list, the list of external users may be expanded to show contact information of each external user, such as name, email, access history, and so on. In some embodiments (not shown with respect to this graphical element 214), the selectable graphical element 214 may display an option to revoke access to each external user of the list of external users. In other embodiments, the selectable banner 216 may display an option to revoke access to all external users. Depending on the permission scheme, in response to the user selection to revoke access to an external user, the system may temporarily block access to the selected external user and notify an administrator that such selection has been made. An administrator may select to permanently revoke access or may restore access to the external user. However, in other embodiments, in response to a tenant user revoking access, the system may prompt the administrator to approve or deny the tenant user's request without revoking access to the external user prior to the administrator action.

In some embodiments, the GUI includes selectable graphical element 216. Selectable graphical element 216 may be rendered in response to a user selection of selectable graphical element 214 or in response to the user hovering over selectable graphical element 214. Selectable graphical element 216 includes additional information that notifies a user that the space is shared with external users and/or it may also include a list of external users, with similar functionality as selectable graphical element 214 described above. In some cases, the list of external users may be displayed as icons 217. The icons 217 may be correspond to a name of a particular external user, avatars, and the like. In some cases, the icons 217 may be selectable to allow a tenant user to view the selected external user's profile. In some cases, upon selecting an icon of the set of icons 217, the application may display event log information data for the particular page. For example, a tenant user may be able to see the last time the external user associated with the selected icon visited the page.

In some embodiments, the graphical element 216 also includes an option to review permissions 218 for external users. Upon user selection of the review permissions option, the user may be redirected to a page, such as the page presented in FIG. 3 and explained below, which may allow a user to revoke access, grant access to additional users, or modify what external users are able to do (e.g., read, write, comment, share) within the space. Selectable graphical element 216 may pop outside of the navigational panel to clearly notify tenant users of external users within the space. The selectable graphical element 216 may be resizable and/or may be moved within the GUI by the user.

In some embodiments, the GUI includes selectable graphical element 220 (also referred to as a "control," "selectable control," "virtual button," or "virtual element"). Selectable graphical element 220 may be displayed within the content panel 204 of the content collaboration platform. The graphical element 220 may be displayed at the top of the page content. In some embodiments, the graphical element 220 may be fixed with respect to the content panel and remain on the same location as the user scrolls down or up the page content. graphical element 220 may include a list of external users with access to the page displayed. In some embodiments, the list of external users may be a list of active external users or users that have recently visited the page. The graphical element 220 may also include a scrolling feature to see additional users. In some embodiments, the display of graphical element 220 may be customizable (e.g., sorting according to user preferences, number of external users displayed). Graphical element 220 may include buttons, such as buttons 222 and 224 that allows the tenant user to revoke access or to vote on an external user's access, respectively. Upon selection of button 222, an external user's access may be revoked immediately, may be revoked immediately but subject to administrator rejection, or the request may be sent to the administrator, as explained above in graphical element 214. In some embodiments, tenant users have the option of voting (e.g. through voting buttons 224) on whether to revoke an external user's access, restore an external user's access, or invite an external user (not shown). For example, a first tenant user may select to revoke access to External User 3. In response, a voting option 224 may be displayed to other tenant users that access the site. Each of the tenant users may vote in favor or against revoking access to the user. After a period of time or after a threshold of votes have been received, the voting may be tallied and the external user may be permanently restricted from access to the page or access may be restored. For example, a majority of votes in favor may restrict the user from accessing the page and a majority of votes against may restore access to the external user. Other voting criteria is possible, such as a threshold number of users voting to revoke access, and so on. In some embodiments, certain tenant users' votes may be weighed more heavily, such as the vote of the page administrator and/or page creator. The voting system is beneficial to crowdsource which external users have access to a page thus decentralizing the responsibility of a single or a few administrators of the space to keep track of the users. This system may also be more responsive to protecting internal information shared with external users.

Additional graphical elements, such as warnings and/or flags may be displayed based on the page content of a page. For example, a tenant user may include mentions of other tenant users and/or external users, such as mention 226. Upon a user including a mention 226 of an external user, the GUI may display a warning sign (e.g., exclamation mark, different font, different color, or any combination thereof) to signal the tenant users that an external user has been mentioned. In response to a revocation of access of an external user, such as 'External User 1,' the mention 226 of the external user may be automatically removed from the page content.

In some embodiments, tenant users can include content in the page intended for internal users only. For example, private content 228 may be input via a command line or other input graphical interfaces that restricts external users from viewing the content. In the GUI, tenant users may view the content. The private content 228 may include a graphical element 214 that alerts users that only tenant users can view the content (e.g., different font, warnings or disclaimers, and so on). The GUI for external users, such as GUI 230 and 240 (shown in FIGS. 2B-2C), may suppress display of such information but will otherwise display page content that is not labeled as private content 228. Due to this feature, tenant users sharing a page with external users do not need to create new pages to share internal information thus reducing the time require to collaborate with internal and external users and reduces the size of spaces.

As another example, page content may be analyzed to determine confidentiality and/or sensitivity of the content. Based on satisfying a threshold, the system may automatically recommend to a tenant user (e.g., an admin) that external user access be revoked. The system may employ a machine learning, or other natural language processing algorithm to analyze the content of the page. In some cases, user (e.g., admin) feedback may be used to retrain the system. Similarly, a threshold for recommending that external user access to be revoked may be based on time that the external user has had access, activity of the page, and the like.

FIG. 2B depicts an example GUI 230 for external users. As explained above, the GUI for external users may have limited features compared to the features available to tenant users. Limiting such features helps improve security because it limits the information available to external users. For example, external users may not see the company directory, browse spaces, use templates, create pages, or use other platforms within the company suite. The collaboration of the external user may be limited to the project and may be revoked once the external user is no longer associated with the project or once other criteria (e.g., time limit, no activity, and so on) is reached.

In some embodiments, GUI 230 for external users may include a limited view of the navigational panel 232. For example, the limited navigational panel 232 may exclude the user selectable graphical elements (e.g., 214, 218 from FIG. 2A), which notify tenant users that the space is shared with external users. The limited navigational panel 232 may also include a limited page tree 234. In some embodiments, GUI suppresses display of the pages within page tree that the external user does not have access to. For example, the page tree of the "EXXTREME TRAVEL" space 210 from FIG. 2A, may include the parent page "ROLLOUT PLANNING" 229. The same space "EXXTREME TRAVEL" in the external user's page tree 234 from FIG. 2B, may exclude the "ROLLOUT PLANNING" page if the external user has not been granted access to the page.

The page content in the content panel 236 may be similar to the page content in GUI 200. For example, embedded content 209 may be displayed to the external user. In some embodiments, the external user's credential may be used to access the external content. If an external user is authenticated (e.g., via authorization manager from FIG. 1), access to view and/or edit the external content may be enabled. In some implementations, the external users may be granted temporary access based on the user credentials of the tenant user that invited the external user. In some examples, page content for an external user may exclude the private content 228 depicted in FIG. 2A above.

The available collaboration features 239 in the content panel can be limited compared to the available collaboration features 212 from FIG. 2A. For example, an external user may star, share, view, or highlight page content, as shown in FIG. 2B. However, the external user may not be able to comment on the page or otherwise block others from editing the page. As another example, the sharing features to the external users may be limited to known internal contacts of the external user. By contrast, a tenant user may be able to share the page content with any tenant user in the enterprise, external users, and with the public. In some embodiments, the administrator can expand or limit the collaboration features 239 (see, e.g., discussion of FIG. 3 below). The external user may also be restricted from accessing features in the top panel 206 from FIG. 2A. For example, as shown in FIG. 2B, the GUI of the external user may display a graphical element 214 informing the external user that the content collaboration platform's features are limited. The external user may be presented with an option to request full access 238. Requesting of full access may require obtaining enterprise approval, administrator approval, and/or full payment of a full-access license.

Figure 2C:
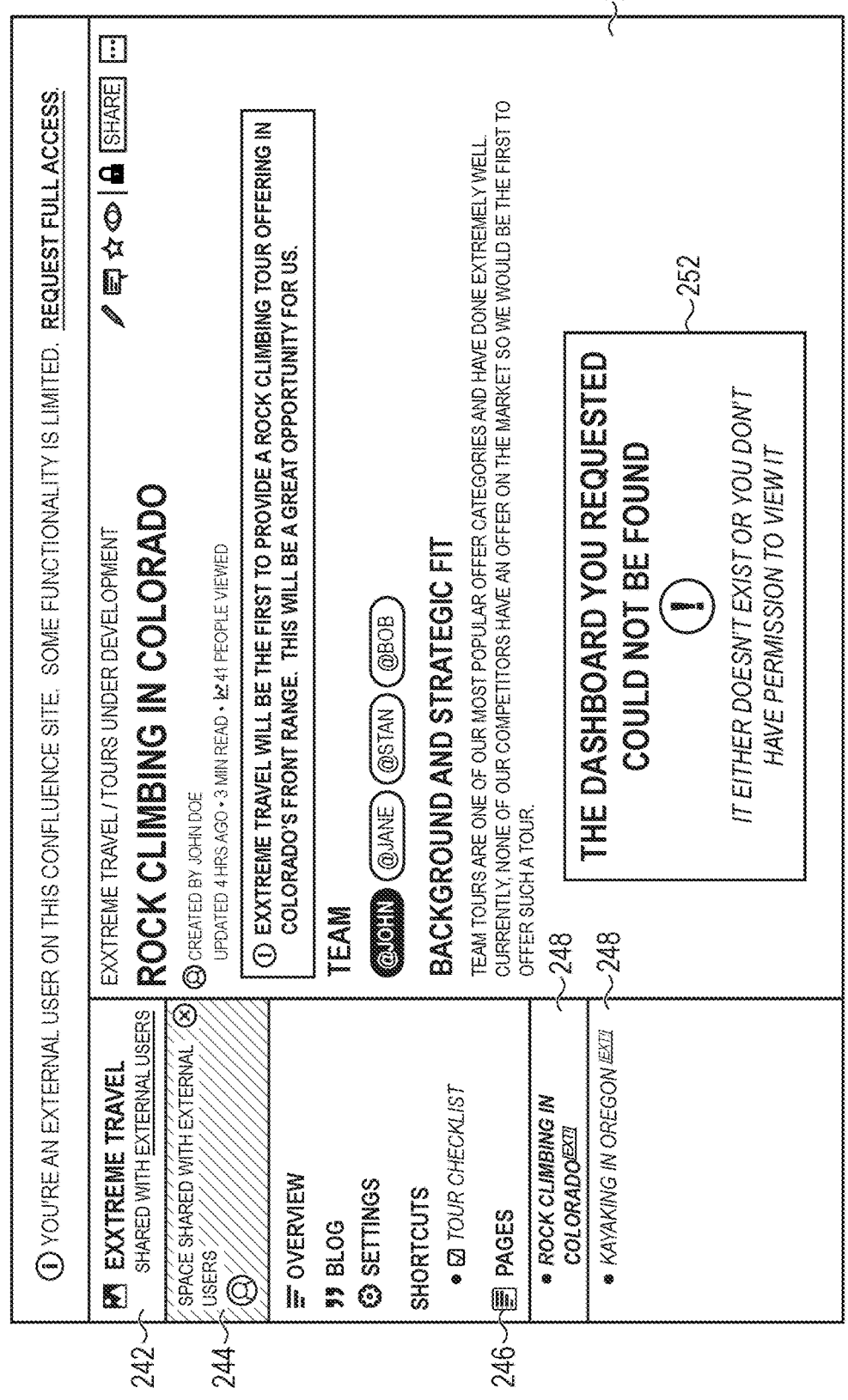

FIG. 2C shows another example of an external user GUI 240 of the content collaboration platform. In this example, the page elements within the page tree 246 are modified compared to the page trees in FIGS. 2A and 2B. In some embodiments, when an external user is invited by a tenant user to collaborate in a space, the tenant user designates a space(s) or a set of pages from the dynamic set of pages within that space. This designation of pages is uploaded onto the external user's profile's (e.g. at a backend application and/or the authorization manager from FIG. 1). The tenant user that invites the user may change (e.g., add or delete) the designated pages that are accessible to the external user. Similarly, other tenant users may add or delete the set of pages that are accessible to the external user. For example, a tenant user with administrator privileges may modify these permissions.

As explained above, the page tree of the content collaboration platform comprises a set of tree elements arranged hierarchically. In some cases, a tenant may designate page access to a page associated with a tree element that have a child or grandchild relationship with respect to a parent element. However, the user may not have access to each respective parent page. Upon receiving the set of designated pages that an external user may access, the page hierarchy may be parsed to determine if a page within the designated set of pages is under a higher hierarchical level restricted to the external user. In response to the page of the set of pages being under the restricted higher hierarchical level, the system may cause display, to a tenant user client device, prompting the tenant user to grant access to the restricted higher hierarchical level. The prompt may also ask the tenant user to confirm the restriction of the higher hierarchical level to the external user. In response to a rejection to grant access to the restricted higher hierarchical level, the system may redefine the hierarchical arrangement of the page from the set of designated pages such that the page is outside the restricted higher hierarchical level (e.g., eliminating the parent relationship). The new hierarchy may result in a removal of the dependency relationship to the element having restricted access. Redefining the hierarchical arrangement may take place locally (e.g., only in the page tree display of the external user) or it may take place for the entire space (e.g., the page tree is redefined to all users accessing the space). The external user GUI 240 may display each page element in the page tree without parent elements if the access to those higher levels is denied. For example, as shown in FIG. 2A the page elements "ROCK CLIMBING IN COLORADO" and "KAYAKING IN OREGON" are under the parent page "TOURS UNDER DEVELOPMENT." However, as shown in FIG. 2C, pages 248, "ROCK CLIMBING IN COLORADO" and "KAYAKING IN OREGON" are standalone page elements without a parent relationship (e.g., "TOURS UNDER DEVELOPMENT" page is suppressed from display). In this example, the tenant user has rejected access to "TOURS UNDER DEVELOPMENT," and thus the page tree has been redefined, as shown, without the restricted page. In response to a tenant user granting access to those parent pages, the page tree in the external user's client device may be modified to reflect the updated permissions.

Redefining the parent and child relationships may eliminate confusion to the external users since pages restricted to the users are not displayed. In some examples, the parent element may be maintained. Upon user selection of the restricted parent page, the content panel 250 may display blank page content and/or may display a warning that the external user does not have access to the parent page. The warning may include a selectable option for the external user to request access including an optional explanation prompt (e.g., drop down menu, text box) on why access is requested. Such request may be displayed to the tenant user that invited the external user to the platform, to the space manager, or both. In yet another example, the designating child pages may automatically grant access to any parent in that hierarchy.

In some examples, graphical elements may be displayed to external users that there are other external users with access to the page or space. For example, graphical element 244 may be displayed within the navigational panel of the space 242. Unlike the selectable graphical elements from FIG. 2A, graphical element 244 may have limited functionality, such as only displaying the names of the other external users with access. In some embodiments, the contact information of other external users may be displayed for external users of the same organization. For example, the external user's profile may be associated with a same email domain and/or the external user's profile may include organization information.

In some embodiments, a backend application may suppress display of embedded content 252 (e.g., smart links). For example, if an external user does not have the user credentials to access the underlying content, a warning may display that the user does not have permission to view the content. In some embodiments, all external users may be barred from viewing external platform content. In other embodiments, the external users may only be barred from viewing embedded content 209 from other platforms within the enterprise's suite but may otherwise view external content from third party platforms.

Figure 3:
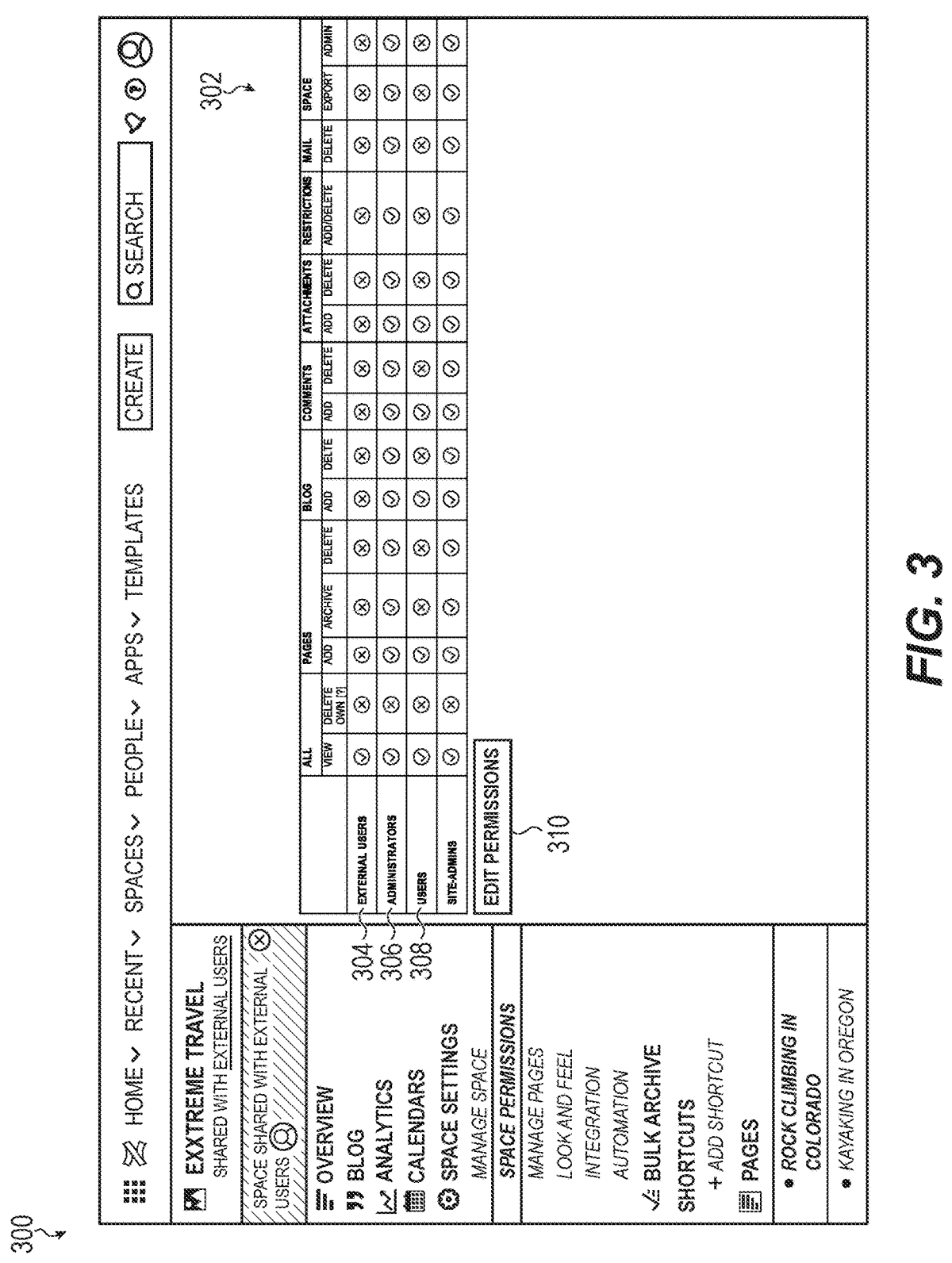

FIG. 3 shows an example page permissions matrix 302 for tenant users and external users. Because the platform can differentiate between tenant and external users (e.g., via designated accounts), administrators may assign permissions based on the type of user account without individually tailoring permissions to each user. This can reduce the amount of time required to give access to the platform to an external user. In some embodiments, however, these permissions may be granted on an account-specific basis (e.g., different permissions for each individual). The permissions matrix 302 allows a tenant user, such as an administrator of a page, to adjust how much an external user may contribute to a space or page. For example, the permissions matrix 302 may specify permissions for pages, blogs, comments, attachment, restrictions, mail, and spaces within the platform. In each of these categories, an administrator may specify read/write access. Similarly, an administrator may specify permissions to save, archive, or export data from the platform.

In some embodiments, the external user 304 may have the most restrictions of in a space. For example, the external user 304 be permitted only to view page content and may be otherwise barred from accessing or writing any blogs, comments, attachments, or mail within the platform. By contrast, an administrator of a space 306 may have the broadest permission of a space. Non-administrator tenant users 308 may have broad read/write access to the platform with few limitations. In some cases, these permissions may be default with the platform. For example, upon enabling external users in a page, the permissions matrix 302 may set to the most restrictive level to external users.

As shown in the figure, tenant users may modify the permissions matrix 302. For example, an edit permissions 310 option may be available to tenant users of a space within the space permissions view 300. In response to a selection of the edit permissions 310 option, a tenant user may modify read/write access to the external users. For example, a tenant user may grant the external user permission to add and delete comments, add pages, add and delete attachments, and so on. In some embodiments, the tenant user that invited the external user to the platform can modify their respective permissions matrix 302 individually. This allows for a more tailored approach to accessing data because the access restrictions are set by those most aware of what the external third party needs to do within the platform.

FIG. 4 depicts an example GUI 400 for inviting an external user onto the content collaboration platform. Inviting external users onto the content collaboration platform allows an external user to designate a space and/or pages within a space for an external user to access. Inviting an external user triggers the creation of an external account upon which tenant users can keep track of the external account's access and usage within the platform. As shown in the figure, a tenant user may provide (e.g., through box 402), contact information of the external user. For example, the contact information may include an email address associated with the external user.

In some embodiments, a suggestion may be made to the tenant user. For example, as the tenant user begins to type, the box may fill in and/or provide suggestions based on at least a portion of the written text. In other embodiments, the text box may fill in emails (e.g., as ghosted text) based on recent communications between the tenant user and a third party (e.g., the system may extract email information from an email server and predict users that need access to a page within the platform). In some embodiments, once a user types the invitee's information, the system may compare the typed information with a database of external users. If the invitee's information matches the contact information of another user within the database, the system may display a warning prompting the user to remove the existing user and/or prompting the user to review the existing user's permissions.

Once a tenant user selects the external user(s) to invite to the content collaboration platform, the tenant user may choose a space, a page, or a group membership to designate to the external user. In some embodiments, the tenant user may choose space and/or page access via box 404, a drop down menu, a type menu, a pop-up box, and so on. Suggestions may also be displayed to the user about spaces and/or pages to grant access to. For example, a suggestion may include a page that is already shared with other external users. In some embodiments, a backend application may perform a semantic analysis based on at least one designated page to the user. The system may suggest adding at least one page based on a semantic similarity threshold of the at least one designated page. In response to a user providing contact information and at least one access page for the external user, the user may select to send the invitation to the external user (e.g., via button 406). A backend application may generate a user profile for the invited guest and send instructions to the external guest with a unique ID linked to the profile. Once an external user accesses the system, the designated pages may be displayed in a navigational panel of a content collaboration platform automatically.

In some embodiments, each tenant user account may have a limit on the number of external users that each tenant user may invite. For example, the tenant user may invite up to 5, 10, 20, or 100 external users. The limit on the number of users may be on a space basis, a page basis, or as to the tenant account as a whole. In some embodiments, when an external user's account becomes inactive, the external user account is credited back to the tenant user and the tenant user may invite another user. In other embodiments, the limit on the number of external users to be invited is on a yearly, monthly, and/or other period of time. For example, an external user may invite up to 5 external users per year. In this configuration, the number of external users can be limited to protect internal information without hampering the collaboration between external parties and internal parties.

Figure 5:
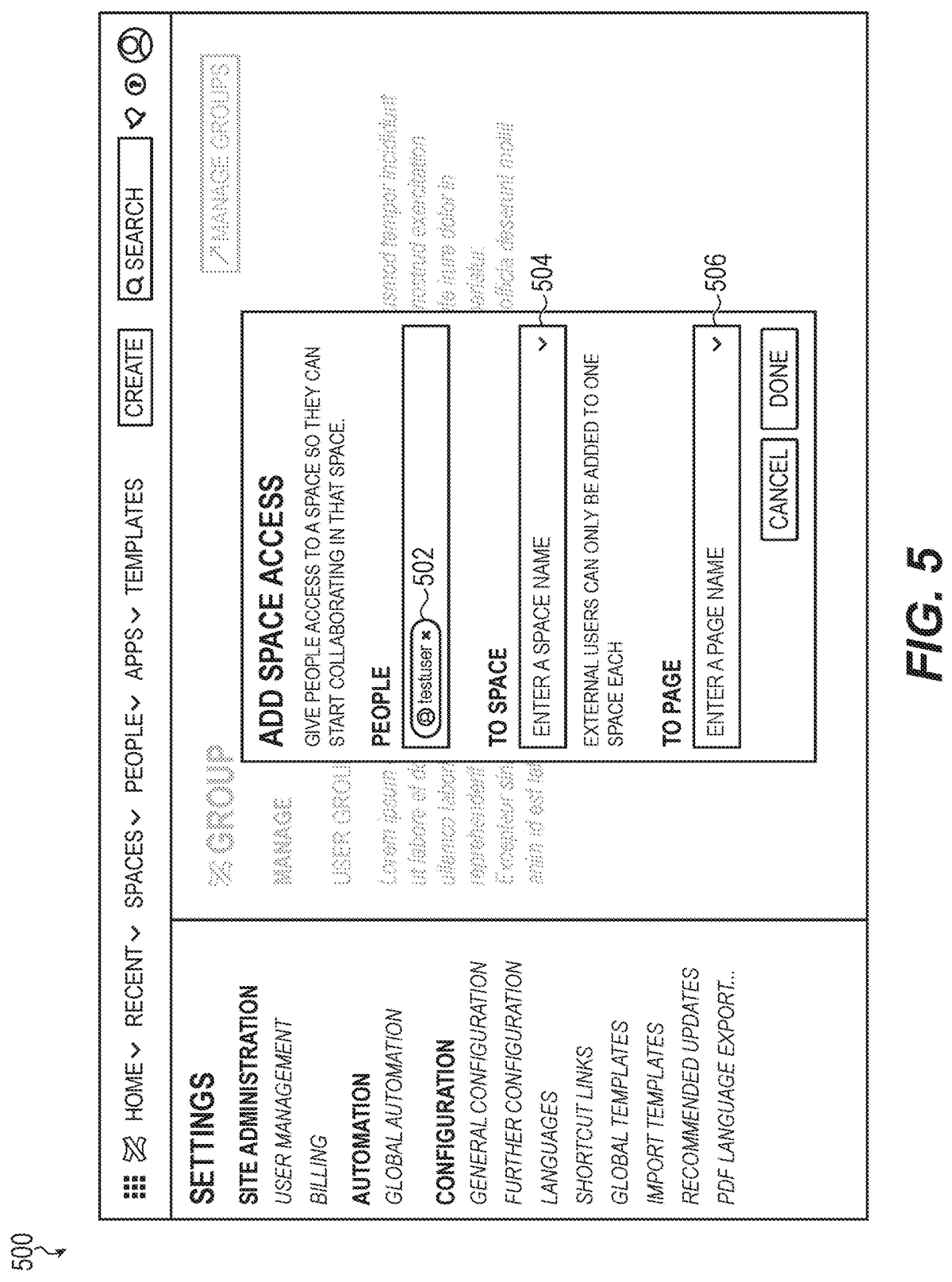

FIG. 5 shows an example GUI 500 for granting page and/or space access to external users. Unlike the GUI 400 shown in FIG. 4, GUI 500 gives external user access to pages and spaces once they have already accessed the platform. For example, a tenant user may designate additional pages to existing external user 502 via a window within the GUI 500. The tenant user may grant access to a space, via drop-down box 504, and/or to a page, via drop-down box 506. Similar to explained above, suggestions on spaces and pages to designate to external users may be displayed based on semantic similarity of pages, for example. In some embodiments, in response to a user selection of a space and/or page, the system may suggest additional external users to be added as collaborators. For example, two external users may have the same company domain and thus may be associated with the same project.

Figure 6:
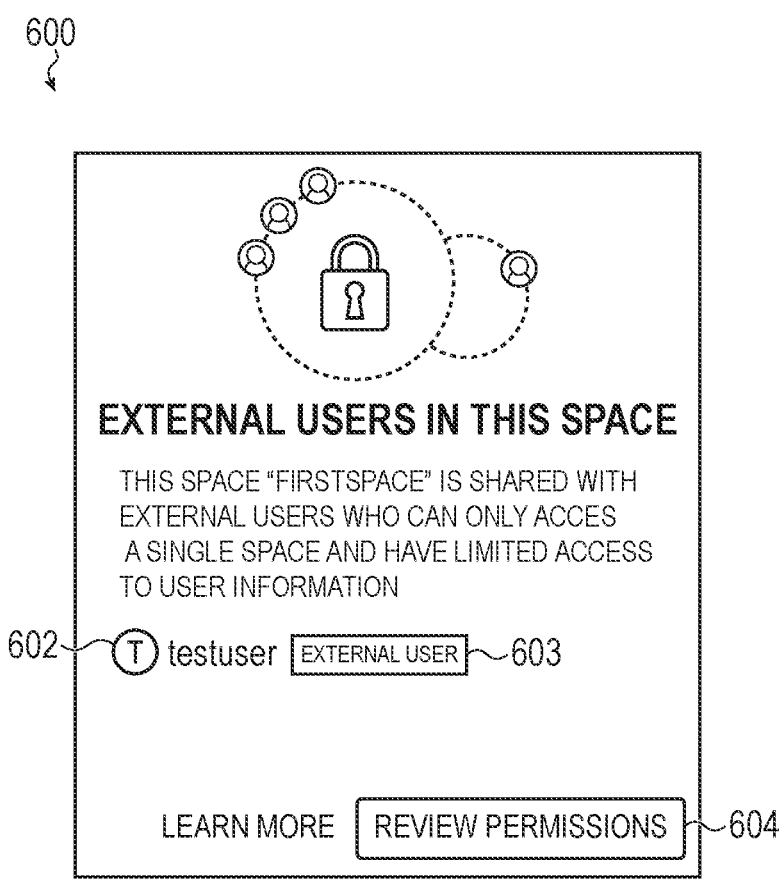
FIG. 6 depicts an example banner.

FIG. 6 depicts an example graphical element 600. Graphical element 600 may be displayed in response to a user selection of a page that has been shared with external users. In some embodiments, graphical element 600 is displayed in response to a user selection of a banner within the navigational panel. Graphical element 600 displays a list of external users, such as user 602. Each external user may include the name of the external user, contact information, avatar, picture, and other tags (such as tag 603) alerting the tenant user that the user 602 is external to the enterprise and/or company. In some embodiments, graphical element 600 is a standalone window that takes up a large portion of the display. The graphical element 600 may also include information about which space and/or which page is being shared to the external users. A tenant user may elect the "Review Permissions" option 604. In response to a user selection of the review permissions option, the platform may display a permissions matrix 302, such as the permission matrix shown in FIG. 3.

Figure 7:
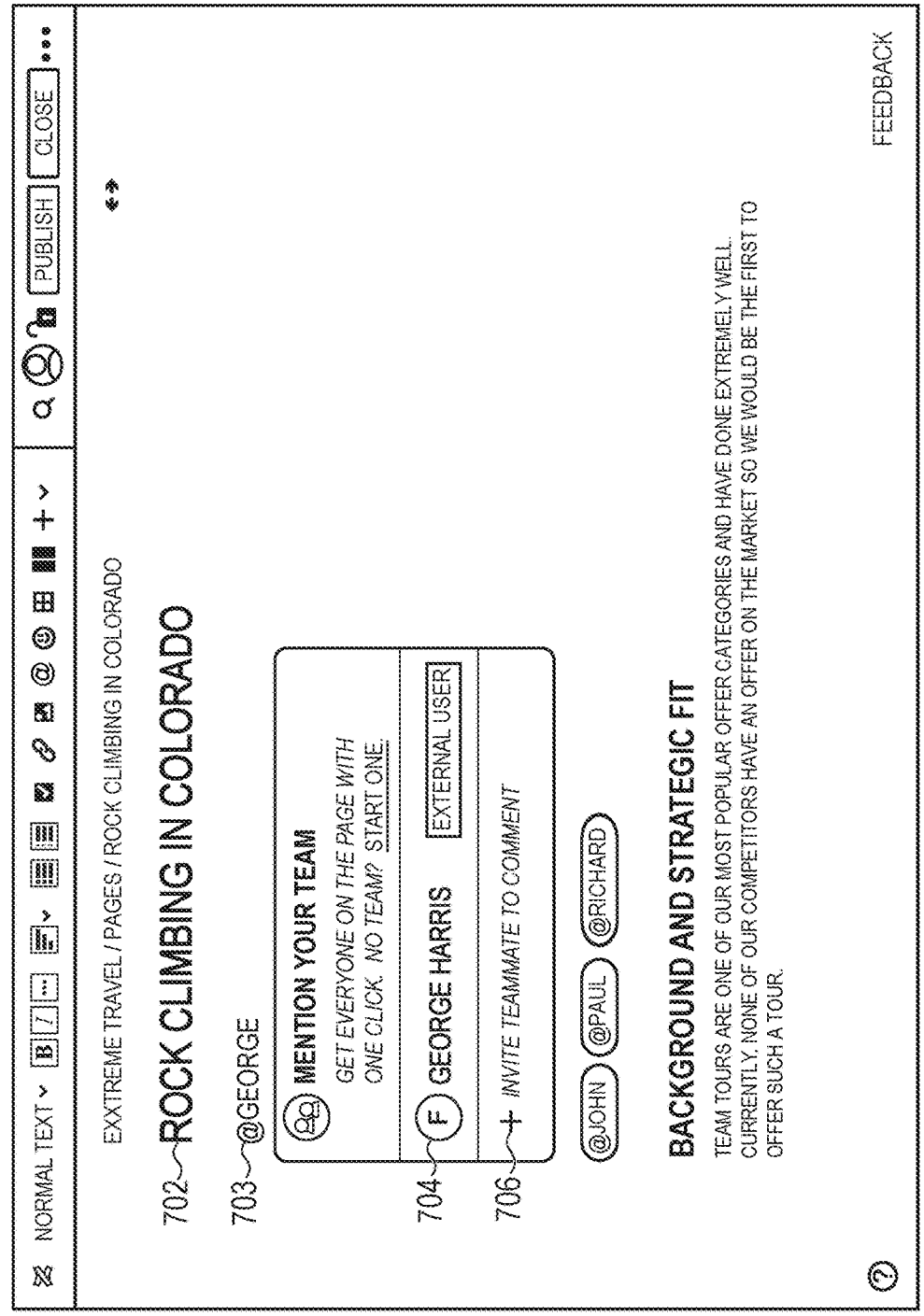
FIG. 7 depicts an example graphical user interface for granting page access in edit mode.

FIG. 7 shows an example user interface 700 for editing page content which allows a tenant user to invite and/or mention external users. In particular, in edit mode 702 of a page, a tenant user (e.g., via a command and/or a button within the page editor) can mention a team member. In some embodiments, the team member may be a tenant user and/or an external user. When the team member is an external user, the GUI may display a tag next to the external user's 704 name to indicate an external user account. In this configuration, the user editing the page may decide whether the content of the page is apt for external users and/or edit the page content so that it does not contain internal-only information. In response to a user mentioning (e.g., @GEORGE 703) an external user, a backend application may determine whether the external user has access to the page. If the external user does not have access to the page, the user may be prompted to grant access to the page. In some embodiments, mentioning an external user without access to a page automatically grants access to the page. In some embodiments, the mentioned user may not have access to the platform and, in response to the mention, the backend application may generate an invitation to the external user comprising the external user's contact information and access to the page being edited. In some embodiments, the page editor may include a command which allows users to invite a guest without clicking and/or leaving the page editor. For example, an invite button 706 may be displayed in response to a command from a user to invite an external user.

In some embodiments, the page editor may suggest inviting external users based on the content and/or the actions of the user. For example, a backend application may analyze the page content of a page and suggest external users based on semantically similar pages which allow external user access. As another example, a backend application may extract information from third-party platforms, such as calendar and/or other file sharing sites, and suggest external users based on a predicted relationship between the page being edited and the information from the background systems. For example, a user editing a page with a project schedule extracted from a calendar app may be prompted to add an external user that has a significant participation in those calendar events. In other embodiments, collaboration suggestions may be made from a videoconference application. For example, information about meeting invitees may be used to predict whether an external user should have access to a page and/or space within the content collaboration platform. In some embodiments, suggestions for adding external users may be based on a group, such as a group from Slack. As another example, social media profiles may be used to suggest external collaborators. In some embodiments, the page content may include labels. Based on the labels, a suggestion for adding external users may be displayed. For example, EXTERNAL USER 1 may have access to pages with a "KAYAKING" label. In response to a tenant user adding a new page with the label "KAYAKING," the user may be prompted to add EXTERNAL USER 1. In some embodiments, adding a label associated with external users automatically grants those external users access to the page.

Figure 8:
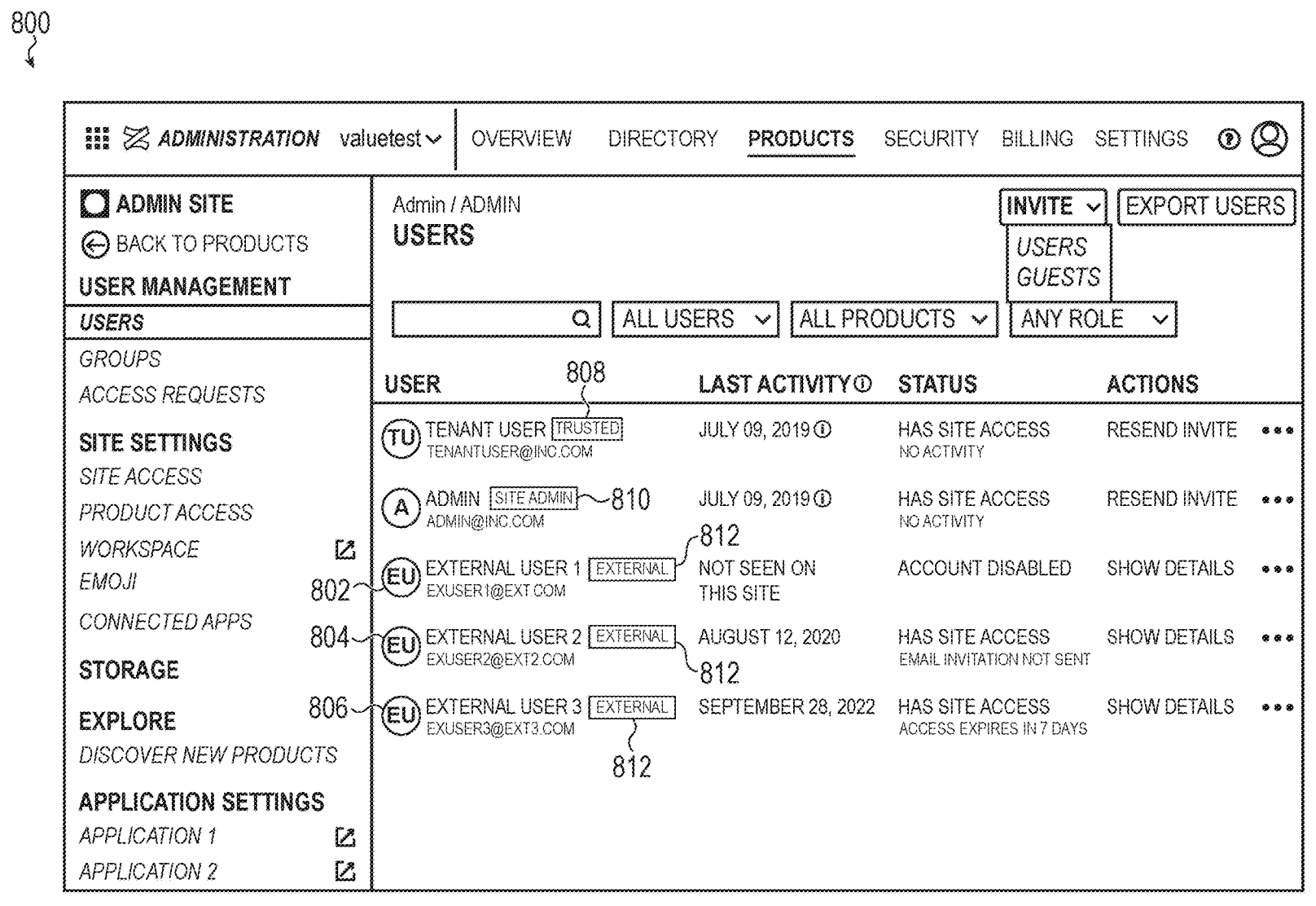

FIG. 8 depicts a user management interface 800. The user management interface 800 allows users of the platform, generally administrators, to monitor user traffic of the platform. The user management interface 800 may include information about the user (e.g., name and contact information), last activity of the platform, status of the user account, and/or other actions, such as resending an invite to use the platform. An administrator using the user management interface 800 may view user access, particularly external user access, to monitor the use, eliminate external user accounts, and/or otherwise set account rules based on usage.

External user accounts may be assigned a set of expiration metrics to better manage external users within the platform. In some embodiments, external users may be assigned temporal access to the platform, access may elapse based on lack of usage, and/or access may elapse based on a user terminating access. For example, "EXTERNAL USER 1" 802 may have access disabled because "EXTERNAL USER 1" never accessed the site. By disabling the account due to no access, internal company information can be protected. As another example, "EXTERNAL USER 2" 804 may not have temporal restrictions. Instead, a tenant user may be responsible for monitoring "EXTERNAL USER 2" within the platform and revoking access on a case-by-case basis. In some examples, a tenant user can see whether "EXTERNAL USER 2" 804 has been sent an invitation to the platform. As another example, external user accounts may expire and/or disable after a preset period of time. "EXTERNAL USER 3" 806, for instance, may be granted access to a page or space for seven days. Depending on the project needs and/or other user settings, the temporal access may be set for 1 day, 7 days, 1 month, a year, or any suitable period of time. In this configuration, the burden on managing and/or keeping track of external users with access to internal data is mitigated. Also, temporal restrictions on accounts prevents the number of external users from ballooning and decreases the overall administrative burden on the users.

In some embodiments, tenant user accounts may be converted to external user accounts. For example, certain spaces may require limited collaboration. Thus, certain tenant user accounts may be treated as external accounts to control access and/or to control editing of the space. Converting tenant user accounts to external user accounts may be done manually or through a predictive algorithm. For example, a backend application may extract and analyze user event logs to determine frequency of usage, pages being accessed, and other event log information. A system may also use information including the top level domain of an email address for each user in a space, the personnel list, and other usage information as part of the predictive algorithm. The predictive algorithm may use a heuristic evaluation for each of these factors to determine if tenant accounts should be converted. For example, an external user which uses the collaboration platform on a regular basis over a period of time may be transitioned to an tenant user. Similarly, the network location of a user outside an expected geographic area may favor converting a user to an external user.

In some cases, external users may also be converted to tenant users. In this situation, a transition from the external to a tenant user account may preserve the data from the external user. Upon transitioning, permissions flags and other restrictions generally associated with external user accounts may be automatically removed (e.g., on a page-by-page basis).

Back to the user management interface 800, the list of users may include labels for "TRUSTED" users 808, "SITE ADMIN" 810, and "EXTERNAL" 812. Similar to the banners, these labels are configured to put users on notice that external users have access to the platform. In some embodiments, a user may filter with respect to spaces, pages, products, and roles within the management interface. In some embodiments, an administrator may assign to an external user a role-based access. Under a role-based access, the external user may have access to spaces and/or pages based on the role of the external user. For example, an external user that is a general contractor for a project may have access to all spaces and/or pages related to the project and related to subcontractors within the project.

Figure 9:
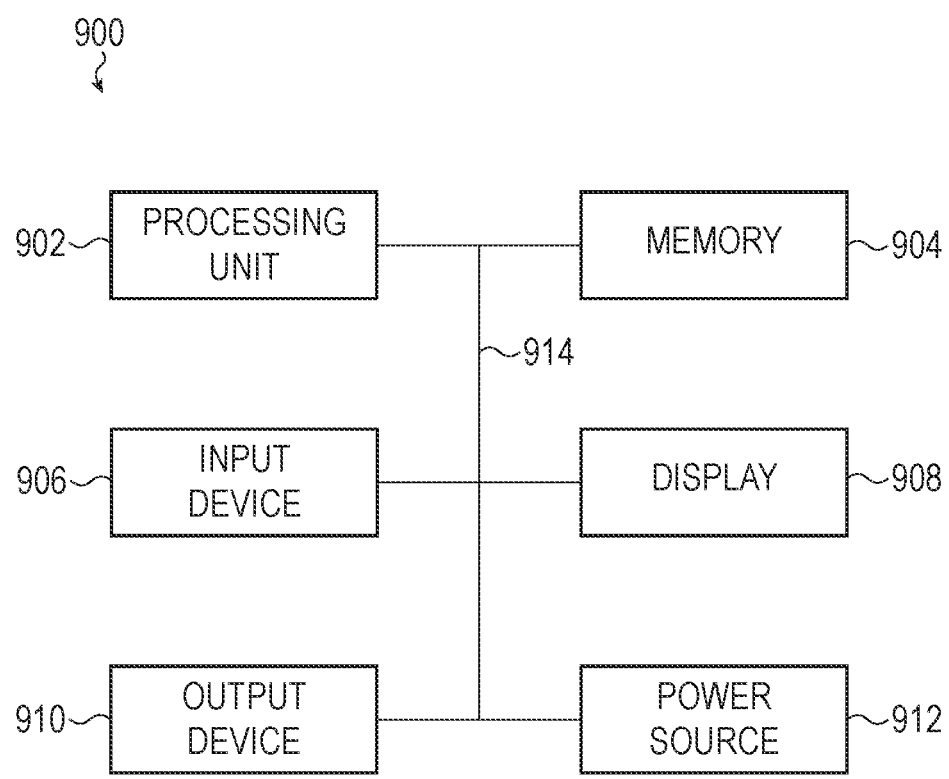
FIG. 9 depicts a sample electrical block diagram of an electronic device that may perform the operations described herein.

FIG. 9 depicts a sample electrical block diagram of an electronic device 900 that may perform the operations described herein. The electronic device 900 may in some cases take the form of any of the electronic devices described with reference to FIGS. 1-8, including client devices, and/or servers or other computing devices associated with the system 100. The electronic device 900 can include one or more of a display 908, a processing unit 902, a power source 912, a memory 904 or storage device, input devices 906, and output devices 910. In some cases, various implementations of the electronic device 900 may lack some or all of these components and/or include additional or alternative components.

The processing unit 902 can control some or all of the operations of the electronic device 900. The processing unit 902 can communicate, either directly or indirectly, with some or all of the components of the electronic device 900. For example, a system bus or other communication mechanism can provide communication 914 between the processing unit 902, the power source 912, the memory 904, the input device(s) 906, and the output device(s) 910.

The processing unit 902 can be implemented as any electronic device capable of processing, receiving, or transmitting data or instructions. For example, the processing unit 902 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements. It should be noted that the components of the electronic device 900 can be controlled by multiple processing units. For example, select components of the electronic device 900 (e.g., an input device 906) may be controlled by a first processing unit and other components of the electronic device 900 (e.g., the display 908) may be controlled by a second processing unit, where the first and second processing units may or may not be in communication with each other.

The power source 912 can be implemented with any device capable of providing energy to the electronic device 900. For example, the power source 912 may be one or more batteries or rechargeable batteries. Additionally or alternatively, the power source 912 can be a power connector or power cord that connects the electronic device 900 to another power source, such as a wall outlet.

The memory 904 can store electronic data that can be used by the electronic device 900. For example, the memory 904 can store computer-readable instructions that, when executed by the processing unit 902 may cause the device 900 to perform one or more of the operations or functions described herein. The memory 904 can also be used to store other electronic data or content including, for example, audio and video files, documents and applications, device settings and user preferences, timing signals, control signals, and data structures or databases. The memory 904 can be configured as any type of memory. By way of example only, the memory 904 can be implemented as random access memory, read-only memory, flash memory, removable memory, other types of storage elements, or combinations of such devices.

In various embodiments, the display 908 provides a graphical output, for example associated with an operating system, user interface, and/or applications of the electronic device 900 (e.g., documentation creation user interface, a chat user interface, an issue-tracking user interface, an issue-discovery user interface). In one embodiment, the display 908 includes one or more sensors and is configured as a touch-sensitive (e.g., single-touch, multi-touch) and/or force-sensitive display to receive inputs from a user. For example, the display 908 may be integrated with a touch sensor (e.g., a capacitive touch sensor) and/or a force sensor to provide a touch- and/or force-sensitive display. The display 908 is operably coupled to the processing unit 902 of the electronic device 900.

The display 908 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 908 is positioned beneath and viewable through a cover that forms at least a portion of an enclosure of the electronic device 900.

In various embodiments, the input devices 906 may include any suitable components for detecting inputs. Examples of input devices 906 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 906 may be configured to detect one or more particular types of input and provide a signal (e.g., an input signal) corresponding to the detected input. The signal may be provided, for example, to the processing unit 902. As discussed above, in some cases, the input device(s) 906 include a touch sensor (e.g., a capacitive touch sensor) integrated with the display 908 to provide a touch-sensitive display. Similarly, in some cases, the input device(s) 906 include a force sensor (e.g., a capacitive force sensor) integrated with the display 908 to provide a force-sensitive display.

The output devices 910 may include any suitable components for providing outputs. Examples of output devices 910 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 910 may be configured to receive one or more signals (e.g., an output signal provided by the processing unit 902) and provide an output corresponding to the signal.

In some cases, input devices 906 and output devices 910 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A method of managing external user accounts and tenant user accounts in a content collaboration platform, the method comprising:

in response to a user input provided to a browser application, the user input comprising a request to access a document space of a content collaboration platform, obtaining authorization credentials for the user and identify a user account associated with the user;

in accordance with the user account being an internal user account associated with a tenant user:

cause display of a first graphical user interface (GUI) for the document space of the content collaboration platform comprising:

a content panel configured to display page content of a page from a set of user-generated pages; and a navigational panel comprising a page tree configured to display a set of selectable elements, each selectable element corresponding to a respective page of a set of user generated pages, each element of the set of selectable elements arranged hierarchically and selectable to cause display of page content of the respective page in the content panel; and in accordance with the user account being an external user account associated with a non-tenant user:

obtaining a permissions profile for the document space;

using the permissions profile, identifying a subset of designated pages from the set of user-generated pages having an external permissions flag that corresponds to the external user account, the subset of designated pages unique to the non-tenant user; and at a second GUI of the content collaboration platform:
suppressing display, at the navigational panel, of a subset of restricted pages restricted to the non-tenant user, the subset of restricted pages different from the subset of designated pages; and at the first GUI of the content collaboration platform:
in response to a determination that access has been permitted to the external user account, updating the first GUI to include display of a graphical element in the navigational panel, the graphical element corresponding to a respective page of the subset of designated pages.

2. The method of claim 1, comprising:
in response to a user selection of the graphical element, displaying a list of non-tenant users having access to the document space; and
in response to a user request to revoke access to a non-tenant user of the list of non-tenant users with respect to a particular page:
updating the permissions profile for the document space; and
suppressing display, at the second GUI, of a particular element in the page tree corresponding to the particular page.

3. The method of claim 2, comprising:
in response to a user selection of the graphical element, displaying a list of non-tenant users having access to the page and a revoke access request corresponding to each non-tenant user of the list of non-tenant users; and
in response to a user selection of the revoke access request for a non-tenant user of the list of non-tenant users:
causing display, to a set of tenant users, a voting interface comprising an option to revoke access to the non-tenant user;
in accordance with a majority of votes from the set of tenant users corresponding to revoking access to the non-tenant user:
updating the permissions profile for the external user account; and
suppressing display, at the second GUI, of the page.

4. The method of claim 1, wherein the non-tenant user is a first non-tenant user and the subset of designated pages is a first subset of designated pages, and comprising:
receiving, from the tenant user, a request to invite a second non-tenant user, the request comprising a second subset of designated pages;
comparing, at a backend application, the first subset of designated pages to the second subset of designated pages; and
causing display of a suggestion to add at least a page from the set of user-generated pages to the second subset of designated pages, the suggestion generated based at least in part on the at least a page being part of the first subset of designated pages.

5. The method of claim 1, wherein:
the non-tenant user is a plurality of non-tenant users; and
the external user account is a single external account shared by the plurality of non-tenant users.

6. The method of claim 1, wherein:
the permissions profile for the external user account comprises read and write access settings to the subset of designated pages.

7. The method of claim 6, wherein:
the permissions profile comprises a time limit; and
in response to the time limit elapsing, disabling the read and write access at each designated page of the subset of designated pages and updating the permissions profile for each designated page of the subset of designated pages.

8. The method of claim 1, wherein:
in accordance with the user account being the internal user account, obtaining the authorization credentials using a first level of security protocols; and
in accordance with the user account being the external user account, obtaining the authorization credentials using a second level of security protocols, the second level of security protocols is lower than the first level of security protocols.

* * * * *